US011971896B2

(12) United States Patent
Brown et al.

(10) Patent No.: US 11,971,896 B2
(45) Date of Patent: Apr. 30, 2024

(54) SYSTEM AND METHOD FOR QUERYING MULTIPLE DATA SOURCES

(71) Applicant: Telepathy Labs, Inc., Tampa, FL (US)

(72) Inventors: Stephen Brown, Singapore (SG); Xiao-Ming Zhou, Singapore (SG)

(73) Assignee: Telepathy Labs, Inc., Tampa, FL (US)

( * ) Notice: Subject to any disclaimer, the term of this patent is extended or adjusted under 35 U.S.C. 154(b) by 149 days.

(21) Appl. No.: 17/635,276

(22) PCT Filed: Aug. 13, 2020

(86) PCT No.: PCT/US2020/046057
§ 371 (c)(1),
(2) Date: Feb. 14, 2022

(87) PCT Pub. No.: WO2021/030524
PCT Pub. Date: Feb. 18, 2021

(65) Prior Publication Data
US 2022/0292092 A1 Sep. 15, 2022

Related U.S. Application Data

(60) Provisional application No. 62/887,217, filed on Aug. 15, 2019.

(51) Int. Cl.
*G06F 16/2455* (2019.01)
*G06F 16/22* (2019.01)
*G06F 16/2458* (2019.01)

(52) U.S. Cl.
CPC ...... *G06F 16/2471* (2019.01); *G06F 16/2246* (2019.01); *G06F 16/24556* (2019.01)

(58) Field of Classification Search
CPC ............ G06F 16/2471; G06F 16/2246; G06F 16/24556
See application file for complete search history.

(56) References Cited

U.S. PATENT DOCUMENTS 8,886,632 B2 * 11/2014 Dettinger .......... G06F 16/24549
707/718
9,747,390 B2 * 8/2017 Cooper .................. G06F 40/30
(Continued)

OTHER PUBLICATIONS

Daniel Kossman, "The state of art in distributed query processing", Dec. 1, 2000, 48 pages, vol. 32, No. 4.
(Continued)

*Primary Examiner* — Huawen A Peng
(74) *Attorney, Agent, or Firm* — Michael T. Abramson; Jordan IP Law, LLC

(57) ABSTRACT

A computing system for querying multiple data sources and a method therefor is provided. The computing system may comprise one or more nodes in communication with at least one data source of the multiple data sources to access data therefrom. The computing system may further comprise a second node in communication with the one or more nodes. The second node may be configured to receive a query instance and process the query instance to generate one or more relational query instances. The one or more relational query instances may be distributed among the one or more nodes to extract data from the at least one data source in communication therewith corresponding to the respective one or more relational query instances. The second node may be further configured to receive extracted data from each of the one or more nodes queried. The second node may be further configured to aggregate the extracted data.

22 Claims, 8 Drawing Sheets

(56) References Cited

U.S. PATENT DOCUMENTS

| | | | |
|---|---|---|---|
| 10,339,151 B2* | 7/2019 | Nguyen | G06F 16/2471 |
| 11,100,177 B2* | 8/2021 | Jaroch | G16H 10/60 |
| 2006/0149719 A1 | 7/2006 | Harris | |
| 2017/0060910 A1* | 3/2017 | Budhiraja | G06F 16/258 |
| 2017/0169102 A1* | 6/2017 | Liu | G06F 16/2452 |
| 2017/0329582 A1* | 11/2017 | Steven | G06F 16/951 |
| 2018/0082183 A1* | 3/2018 | Hertz | G06Q 10/10 |
| 2019/0034496 A1* | 1/2019 | Acosta | G06F 16/248 |

OTHER PUBLICATIONS

Anonymous, "Client-server model", Mar. 15, 2019, 6 pages, retrieved from <wikipedia.org/wiki/Client%E2%80% 93server_model>.
Mohamed Fatma et al., "Optimized elastic query mesh for cloud data stream", Jun. 19, 2015, 15 pages.
European Search Report for Application No. 20852060.1, dated Jul. 17, 2023, 9 pages.

\* cited by examiner

SYSTEM AND METHOD FOR QUERYING MULTIPLE DATA SOURCES

CROSS-REFERENCE TO RELATED APPLICATIONS

This application is a U.S. National Stage of International Patent Application No. PCT/US2020/046057, filed on 13 Aug. 2020, which claims the benefit of U.S. Provisional Application Ser. No. 62/887,217, filed on 15 Aug. 2019. The disclosures of which are incorporated herein by reference in their entirety.

BACKGROUND

Data proliferation may involve information typically being generated and stored in multiple data sources across, for example, an enterprise. Systems, such as database systems, managing large amounts of data may distribute and/or replicate that data across multiple data sources, often in different locations, including on premise, remotely and/or on the cloud, for any of a number of reasons, including, e.g., security issues, disaster prevention and recovery issues, data locality and availability issues, etc.

BRIEF SUMMARY OF DISCLOSURE

The present disclosure may include but is not limited to a computing system for querying multiple data sources, a computer implemented method for querying multiple data sources, a computer program product residing on a computer readable storage medium, and a computing system including one or more processors and one or more memories.

In an example implementation, the computing system for querying multiple data sources may comprise one or more nodes. Each of the nodes may be in communication with at least one data source of the multiple data sources to access data therefrom. The computing system may further comprise a second node in communication with the one or more nodes. The second node may be configured to receive a query instance. The second node may be further configured to process the query instance to generate one or more relational query instances based, at least in part, on the query instance, with each of the one or more relational query instances to be processed by at least one node. The one or more relational query instances may be distributed among the one or more nodes to extract data from the at least one data source in communication therewith corresponding to the respective one or more relational query instances. The second node may be further configured to receive extracted data from each of the one or more nodes queried. The second node may be further configured to aggregate the extracted data.

One or more of the following example features may be included. The one or more nodes may be arranged in a hierarchical structure and the one or more relational query instances may be distributed among the one or more nodes directionally from upper nodes to lower nodes. In another example, the second node and the one or more nodes may be arranged across at least two or more different enterprise networks. The second node configured to receive the query instance may further comprise the second node is configured to receive a natural language query request related to obtaining data stored in the multiple data sources and the second node configured to process the query instance may further comprise the second node is configured to parse the natural language query request to generate the one or more relational query instances. The second node configured to parse the natural language query request may further comprise the second node is configured to utilize metadata information. The second node may be further configured to generate at least one of an Abstract Semantic Graph (ASG) and an Abstract Semantic Tree (AST) for the natural language query request. At least one of the generated ASG and AST may receive the metadata information. The second node may be further configured to process the extracted data to generate a response based on the query instance. The at least one node of the one or more nodes may be further configured to optimize the one or more relational query instances to distribute among one or more of the at least one data source of the multiple data sources and at least another node of the one or more nodes. As an example, at least one data source of the multiple data sources may be one of a database and a node of the one or more nodes.

In another example implementation, a computer-implemented method for querying multiple data sources is disclosed. The computer-implemented method may include receiving a query instance. The query instance may be processed to generate one or more relational query instances based at least in part on the query instance, with each of the one or more relational query instances to be processed by at least one server node of one or more server nodes. The one or more relational query instances may be distributed among one or more server nodes to extract data from the at least one data source in communication therewith corresponding to the respective relational query instance received thereby. The extracted data may be received from each of the queried one or more server nodes. The extracted data may be aggregated.

One or more of the following example features may be included. Distributing the one or more relational query instances may further include distributing the one or more relational query instances among the one or more server nodes directionally from upper server nodes to lower server nodes. In another example, distributing the one or more relational query instances may further include distributing the one or more relational query instances among the one or more server nodes across at least two or more different enterprise networks. Receiving the query instance may further include receiving a natural language query request related to obtaining data stored in the multiple data sources and processing the query instance may further include parsing the natural language query request to generate the one or more relational query instances. Parsing the natural language query request may further include utilizing metadata information. The computer-implemented method may further comprise generating at least one of an Abstract Semantic Graph (ASG) and an Abstract Semantic Tree (AST) for the natural language query request. At least one of the generated ASG and AST may receive the metadata information. The extracted data may be processed to generate a response based on the query instance. The one or more relational query instances may be optimized to distribute among one or more of the at least one data source of the multiple data sources and at least one of another server node of the one or more server nodes. At least one data source of the multiple data sources may be one of a database and a server node of the one or more server nodes.

In yet another example implementation, a computer program product residing on a computer readable storage medium having a plurality of instructions stored thereon is provided. The computer program product, when executed across one or more processors, causes at least a portion of the one or more processors may perform operations comprising receiving a query instance. The query instance may be processed to generate one or more relational query instances based at least in part on the query instance, with each of the one or more relational query instances to be processed by at least one server node of one or more server nodes. The one or more relational query instances may be distributed among the at least one server node of the one or more server nodes to extract data from the at least one data source of the multiple data sources in communication therewith corresponding to the one or more relational query instances. The extracted data may be received from each of the one or more server nodes queried. The extracted data may be aggregated.

In another example implementation, a computer-implemented method for querying multiple data sources is disclosed. The computer-implemented method may include receiving a query instance. The query instance may be processed to generate one or more relational query instances based at least in part on the query instance, with each of the one or more relational query instances to be processed by a server module. The one or more relational query instances may be sent to the server module to extract data from at least one data source of the multiple data sources in communication therewith corresponding to the one or more relational query instances. The extracted data may be received from the server module queried. The extracted data may be aggregated. The method may include one or more enterprise query nodes where each enterprise query node may include one of a client module and one of the server module.

In another example implementation, a computer-implemented method for querying multiple data sources is disclosed. The computer-implemented method may include receiving a query instance. The query instance may be processed to generate one or more relational query instances based at least in part on the query instance, with each of the one or more relational query instances to be processed by at least one server node. The one or more relational query instances may be distributed among one or more server nodes to extract data from the at least one data source in communication therewith corresponding to the respective relational query instance received thereby. The extracted data may be received from each of the queried one or more server nodes.

Other example implementations or embodiments may include: a system as shown and described in this disclosure, a query base system (e.g., enterprise query base system), an enterprise query base node, a hierarchy of enterprise query base nodes, a method for querying multiple data sources as shown and described in this disclosure, a method for implementing an enterprise query base system, a computer-implemented method substantially as described with reference to any of the examples and/or to any of the drawings in this disclosure, a computing system including one or more processors and one or more memories configured to perform operations substantially as described with reference to any of the examples and/or to any of the drawings in this disclosure, a computer program product residing on a computer readable storage medium having a plurality of instructions stored thereon which, when executed across one or more processors, causes at least a portion of the one or more processors to perform operations substantially as described with reference to any of the examples and/or to any of the drawings of this disclosure, and an apparatus configured substantially as described in this disclosure with reference to any of the examples and/or to any of the drawings in this disclosure.

The details of one or more example implementations are set forth in the accompanying drawings and the description below. Other possible example embodiments, features, aspects, and/or possible example advantages will become apparent from the description, the drawings, and the claims. Some implementations may not have those possible example features and/or possible example advantages, and such possible example embodiments, features, aspects, and/ or possible example advantages may not necessarily be required of some implementations.

BRIEF DESCRIPTION OF THE DRAWINGS

Like reference symbols in the various drawings indicate like elements.

DETAILED DESCRIPTION

Figure 1:
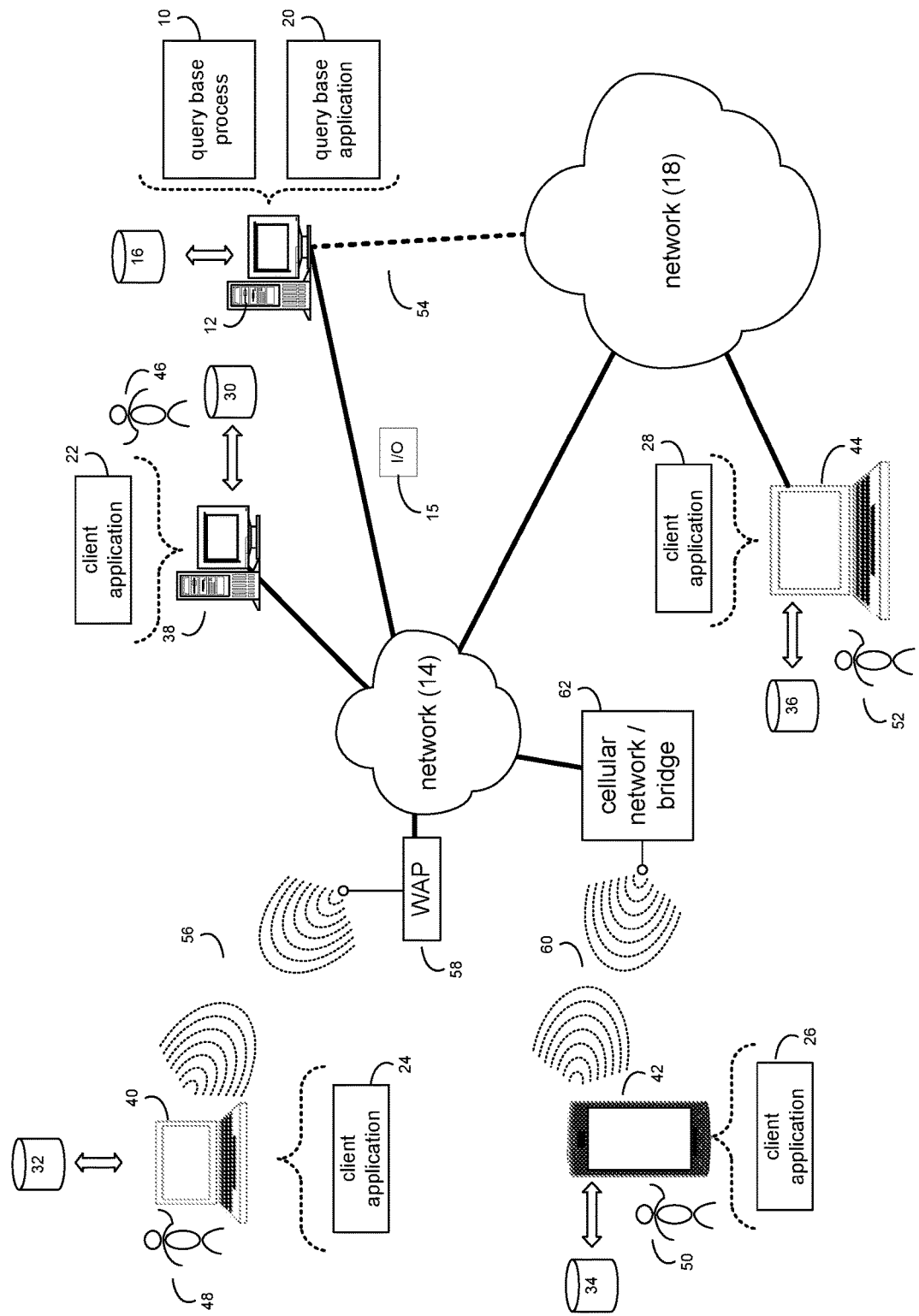
FIG. 1 is an example diagrammatic view of a query base process coupled to an example distributed computing network according to one or more example implementations of the disclosure.

As noted above, data proliferation may involve information typically being generated and stored in multiple data sources across, for example, an enterprise. Systems, such as database systems, managing large amounts of data may distribute and/or replicate that data across multiple data sources, often in different locations, including on premise, remotely and/or on the cloud, for any of a number of reasons, including, e.g., security issues, disaster prevention and recovery issues, data locality and availability issues, etc. Such database systems may be implemented either as a distributed database or a distributed file system that may tend not to scale well for data mining and business intelligence applications that may require fast and efficient retrieval and processing of large volumes of data. Furthermore, such database systems may pose problems for third party applications, which may face the challenge of accessing data behind a firewall without copying or replicating the sensitive data from the enterprise data source. One example technique may be to copy or replicate data from one system into another system, when there is a need to utilize information that is present in the other system. This is typically done using Extract, Transform, and Load (ETL) technology or replication technology. Some enterprises may implement enterprise data hubs (EDHs), which may provide a more practical and scalable solution than other enterprise data systems. An enterprise data hub may be a large storage repository that holds a vast amount of raw data in its native format until it is needed for enterprise-wide information storage and sharing. The enterprise data hubs may provide that all content from disparate sources ingested into the enterprise data hub and made available for search.

While some applications may be best served by copying all the data into a data warehouse or a data lake, it may be beneficial to minimize data redundancy and increase the freshness of data by providing ways to access the data from its native location without the need of moving the data to a single data warehouse or a single data lake. Moreover, in some cases, legal aspects forbid copying sensitive data to an external data warehouse or data lake.

The present disclosure may relate to a computing system to address the example and non-limiting data proliferation issue, for example, in an enterprise environment, where information is typically generated and stored in multiple data sources. The present disclosure may make use of a query communication mesh concept to provide a way to access and process integrated data from multiple data sources in a network without creating redundant data stores. This may provide a way to distribute and push down the query to the data stored at its native location and avoid the need of transferring large amounts of sensitive data across the network. The present disclosure may implement an elastic mesh technique to tackle various complex enterprise data source issues which may include hybrid data sources including on premise and in cloud, and/or systems across geographic regions, different firewalls, and different networks separated by firewalls, etc.

In some implementations, the system may be implemented as a directional graph or tree-like mesh that passes the query from an application client to a data source by employing one or more enterprise query base (EQB) nodes. Each of the EQB nodes may include or may either act as one of a client node that receives the query and a server node which, in turn, is connected to one or more back-end data sources to access data therefrom. The client node of the EQB subsystem at the root of the tree may receive the query (often in natural language), and may translate and pass a processed query to the server node (e.g., location of data source). The processed query may be divided into multiple sub-queries, according to a build plan or an execution plan, to be processed by one or more data sources in communication with the server node of the same EQB subsystem and/or to be selectively distributed among server nodes of some of the other EQB nodes.

In some implementations, the query may be pushed down to the data source(s). There may be a clear direction and client/server relationship such as a clear direction from the client node which may receive a natural language query, may process/translate natural language to be distributed among different nodes from processing thereof. The system may send out one query that can move down chain towards different EQB nodes that are able to pass query in a direction or directions towards multiple data sources that are associated therewith and have information needed for processing the query. The processed query may not include the calculated route information but instead, each EQB node may keep destination data source mapping and may optimize the query plan itself. That is, each EQB node itself may be a sub-query engine and may process the sub-query (e.g., filtering, joining, aggregating, etc.).

Distributed databases for large volumes of data, perhaps on the order of terabytes, may be implemented across several servers, each designed to host a portion of a database and typically storing a particular table data. Typically, such distributed database systems may involve a partitioned database or database grid under the same network (e.g., intranet). The objective of the distribution of the data partition in different data sources in existing systems may be typically for performance e.g., using parallel or distributed approaches to access different data partitions concurrently and more efficiently. In some examples, a network of connected nodes may be provided in the form of a distributed federated database system, which is a type of metadata base management system (DBMS), which may transparently map multiple autonomous database systems into a single federated database. The constituent databases may be distributed and interconnected via a computer network and may be geographically decentralized. In traditional database systems, all nodes may be configured to be able to send/receive queries with all nodes being treated equal (e.g., no client/server relationship). These types of database systems are generally not able to handle different types of data sources from multiple vendors, e.g., where some data sources are behind a firewall, some data sources are in the cloud, etc. On the other hand, third party applications may also face the challenge of accessing data behind a firewall without copying or replicating the sensitive data from the enterprise data source.

The present disclosure may provide a computing system (also, sometimes, referred to as "query base system") which may be based on a mesh concept, that may work as a gateway for a data source federation, may distribute queries, and may aggregate the result from different data sources. The query base system may not be a database management system and may not store data with itself, but may be a query engine, which may be used to query different types of databases. Therefore, the system may generally be placed at a level above in the network hierarchy in relation to database management systems. In some implementations, the system may facilitate connection to different data sources, including different locations of the data source and/or different types of data sources. The system may provide the ability to understand different types of data sources (e.g., Oracle, MongoDB, IBM, SAP, or other data sources). Whereas other data systems may describe querying data within the same organization, the disclosed system may be enabled to query at a level above the organization such as querying different network database systems. Each of these networks may have varying security concerns depending on the network. When the query base system queries the network, the actual network may perform sub-queries of their actual data and then the network may output results to the query base system, thus mitigating security and third-party access concerns. The results obtained from one or more networks may provide the relevant data by merging results together, in contradistinction to other example systems that obtain results from the actual data within their own network.

In some implementations, the query base system may use different operators (e.g., link multiple operators together) for querying data from different data sources instead of simply storing data. The system may cross different networks including the Internet to access one or more data sources behind a firewall. Further, the system may integrate with Natural Language Processing (NLP), which may handle semantic mapping and may remove the barrier for the application to query different data sources with different query languages. The query base system may use semantic operations that may be adapted for different types of data sources, for example, depending on type of data source, the network/geographic location of the data source, available access type, etc. (e.g., allowing the system to access different types of data sources that may require different accessibility). This means that the system may be able to generate a sub-query for one data source that may be completely different from a sub-query generated for a second different data source, thus enabling the system to function across different types of networks and also different types of data source.

System Overview:

In some implementations, the present disclosure may be embodied as a system, method, apparatus, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system". Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures show the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown a query base process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a query base process, such as query base process 10 of FIG. 1, may include each of one or more server nodes communicating with at least one of the multiple data sources to access data therefrom. The query base process may further include receiving a query instance. The query instance may be processed to generate one or more relational query instances based at least in part on the query instance, with each of the one or more relational query instances to be processed by at least one server node. The one or more relational query instances may be distributed among one or more server nodes to extract data from the at least one data source in communication therewith corresponding to the respective relational query instance received thereby (e.g., one or more server nodes may distribute relational query instances to different data sources). The extracted data may be received from each of the queried one or more server nodes. The received extracted data may be aggregated.

In some implementations, the instruction sets and subroutines of the query base process 10, which may be stored on storage device, such as storage device 16, coupled to computer 12, may be executed by one or more processors and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, query base process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a query base application (e.g., query base application 20) examples of which may include, but are not limited to, e.g., an enterprise query base application, natural language understanding application, voice processing system application, and the like. In some implementations, query base process 10 may be accessed via one or more of client applications 22, 24, 26, 28. In some implementations, query base process 10 may be a standalone application, or may be an applet/application/script/extension that may interact with and/or be executed within a query base application 20, a component of query base application 20, and/or one or more of client applications 22, 24, 26, 28. In some implementations, query base application 20 may be a standalone application, or may be an applet/application/script/extension that may interact with and/or be executed within query base process 10, a component of query base process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of query base process 10 and/or query base application 20. Examples of client applications 22, 24, 26, 28 may include, but are not limited to, a query base application such as an enterprise query base application, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™ Apple® iOS®, Mac® OS X®; Red Hat® Linux®, or a custom operating system.

In some implementations, one or more of client applications 22, 24, 26, 28 may be configured to effectuate some or all of the functionality of query base process 10 (and vice versa). Accordingly, in some implementations, query base process 10 may be a purely server-side application, a purely client-side application, or a hybrid server-side/client-side application that is cooperatively executed by one or more of client applications 22, 24, 26, 28 and/or query base process 10.

In some implementations, one or more of client applications 22, 24, 26, 28 may be configured to effectuate some or all of the functionality of query base application 20 (and vice versa). Accordingly, in some implementations, query base application 20 may be a purely server-side application, a purely client-side application, or a hybrid server-side/client-side application that is cooperatively executed by one or more of client applications 22, 24, 26, 28 and/or query base application 20. As one or more of client applications 22, 24, 26, 28, query base process 10, and query base application 20, taken singly or in any combination, may effectuate some or all of the same functionality, any description of effectuating such functionality via one or more of client applications 22, 24, 26, 28, query base process 10, query base application 20, or combination thereof, and any described interaction(s) between one or more of client applications 22, 24, 26, 28, query base process 10, query base application 20, or combination thereof to effectuate such functionality, should be taken as an example only and not to limit the scope of the disclosure.

In some implementations, one or more of users 46, 48, 50, 52 may access computer 12 and query base process 10 (e.g., using one or more of client electronic devices 38, 40, 42, 44) directly through network 14 or through secondary network 18. Further, computer 12 may be connected to network 14 through secondary network 18, as shown with phantom link line 54. Query base process 10 may include one or more user interfaces, such as browsers and textual or graphical user interfaces, through which users 46, 48, 50, 52 may access query base process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
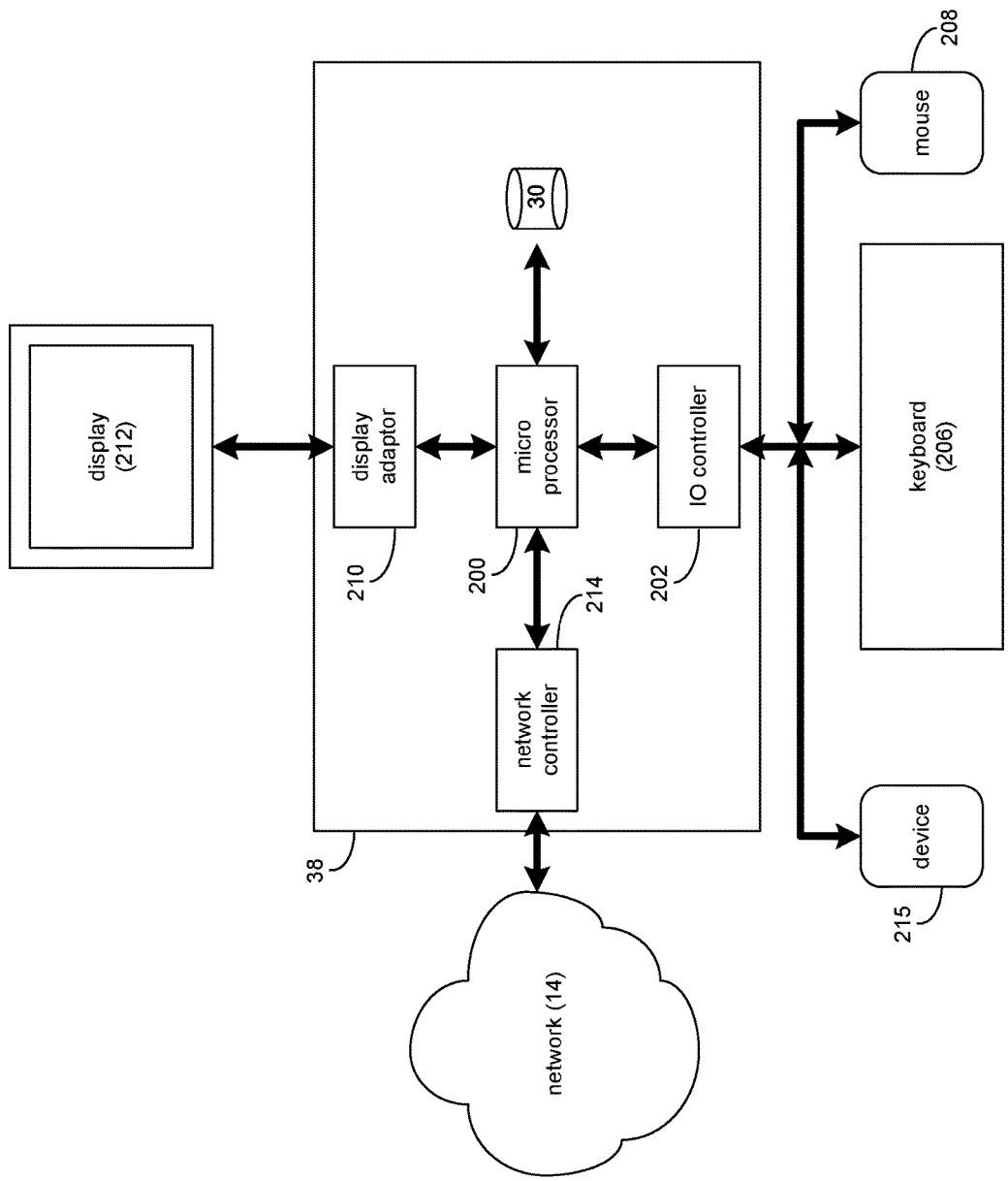
FIG. 2 is an example diagrammatic view of a client electronic device of FIG. 1 according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, query base process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touch-screen monitor(s), plasma, CRT, or LCD monitor(s), etc.)

with microprocessor 200, while network controller/adaptor 214 (e.g., an Ethernet adaptor) may be configured to couple microprocessor 200 to the above-noted network 14 (e.g., the Internet or a local area network).

As will be discussed below, the query base process 10 may be integrated into a practical application to at least help, e.g., improve existing technological processes associated with, e.g., querying of multiple data sources necessarily rooted in computer technology.

It will be appreciated that the computer processes described throughout are not considered to be well-understood, routine, and conventional functions.

Figure 3:
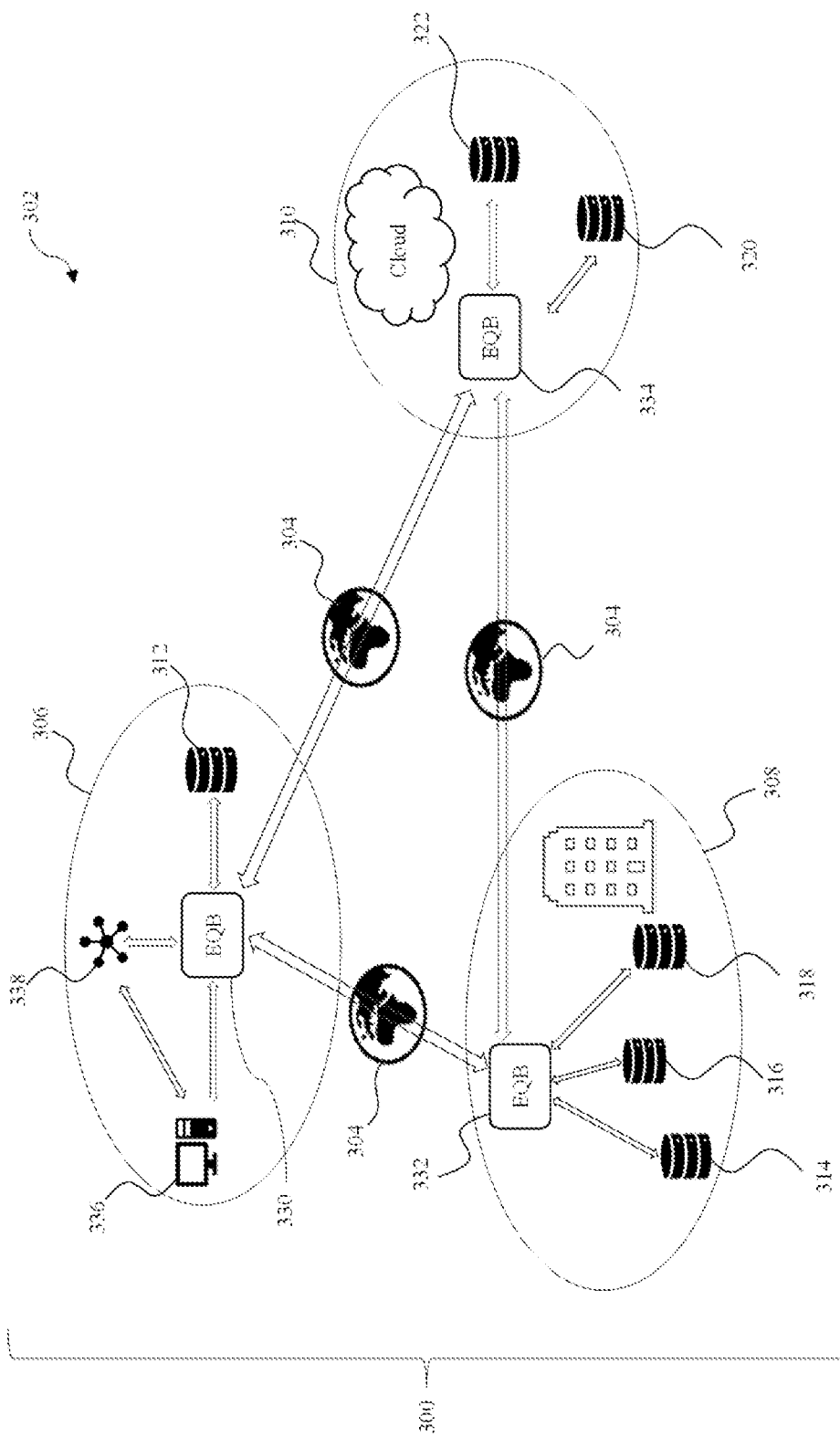
FIG. 3 is an example diagrammatic view of a network environment implementing a query base system with multiple enterprise query base nodes distributed therein according to one or more example implementations of the disclosure.

The Query Base System:

The example implementation of FIG. 3 shows a schematic of a network environment (e.g., network environment 300), in accordance with one or more example embodiments of the present disclosure. The network environment 300 may implement the query base system 302 (hereinafter, sometimes, simply referred to as "network system" or "system"). In some implementations, the network environment 300 may be an enterprise network environment. An enterprise network may be generally defined as an enterprise's communications backbone that helps connect computers and related devices across departments and workgroup networks, facilitating insight and data accessibility. The network environment 300 may reduce communication protocols, facilitating system and device interoperability, as well as improve internal and external enterprise data management. The network environment 300 may include local and wide area networks (LAN/WAN), depending on operational and departmental requirements. The network environment 300 may effectively combine and use different device and system communication protocols. For example, the network environment 300 may integrate all systems, including Windows and Apple computers and operating systems (OS), Unix systems, mainframes and related devices like smartphones and tablets.

In the example of FIG. 3, the network environment 300 may be a hybrid cloud network with multiple mesh nodes 330, 332, 334 which may be communicating with each other using, for example, Internet 304 as a backbone. Each of the multiple mesh nodes 330, 332, 334 may form a sub-net in the network environment 300. In the shown example, the network environment 300 may include three sub-nets, namely an application sub-net 306, a local sub-net 308, and a cloud sub-net 310. Each of the sub-nets 306, 308 and 310 may include respective one or more data sources. In the shown example, the application sub-net 306 may include a data source 312, the local sub-net 308 may include data sources 314, 316 and 318 and the cloud sub-net 310 may include data sources 320 and 322. It may be appreciated that network environment 300 may be deployed by an enterprise, for example an organization or a company, which may own or have access to servers located on company property at on-premises location and/or servers in the cloud. The on-premises servers may include some dedicated servers that are physical machines and other dedicated servers that run a virtualization host (vHost or hypervisor) software, such as VMWare or Xen, originally developed by the University of Cambridge Computer Laboratory. The virtualization host software runs several virtual-machine nodes, VM nodes, which can each run applications to service client requests.

In the example, the network system 302 provides enterprise query base (EQB) nodes 330, 332, and 334 for each of the sub-nets 306, 308 and 310, respectively. For example, the application sub-net 306 may include an application EQB node 330, the local sub-net 308 may include a local EQB node 332, and the cloud sub-net 310 may include a cloud EQB node 334. The application EQB node 330 may be deployed locally with the data source 312 (e.g., locally deployed data source), the local EQB node 332 may be deployed on-premises with the data sources 314, 316 and 318 (e.g., on-premises deployed data sources), and the cloud EQB node 332 may be deployed on cloud with the data sources 320 and 322 (e.g., cloud deployed data sources). Also, as shown, the application sub-net 306 may include a client application 336 for receiving/generating a query (e.g., variety types of data search queries such as navigational queries, informational queries, and/or transactional queries) for the application EQB node 330. For example, the query may be received as a natural language query such as "show me the sales for our products last year" (e.g. from user speech). Further, the application sub-net 306 may include a graph database 338 for providing metadata for processing the query (e.g., a semantic service may be used with a graph database for metadata or a graph database that stores metadata from the semantic service—the semantic service may be part of an NLP system). As shown, the application EQB node 330 may communicate directly with the graph database 338 and the client application 336 in processing the query. Further, the client application 336 may communicate with the graph database 338 in processing the query.

In some implementations, each of the nodes 330, 332 and 334 may interact with respective data source(s) only. That is, the application EQB node 330 may interact with the data source 312 (e.g., containing application data), the local node 332 may interact with the data sources 314, 316 and 318 (e.g., containing premises data), and the cloud node 334 may interact with the data sources 320 and 322. These nodes 330, 332, and 334 may have specific unique permissions allowing each node 330, 332, 334 to interact with its respective data source locations (e.g., application data, premises data, or cloud data). For instance, the cloud node 322 may not be able to interact with premises data as the cloud node 322 may not have permissions to access the on-premises data sources 314, 316 and 318. In summary, the query may have a direction sent from a front end to data sources where each EQB node may be connected to data sources within the same sub-network as described above (based or dependent on EQB node's permissions).

The system 302 may be provided with multiple nodes, e.g., nodes 330, 332 and 334 in different locations such that each of the nodes 330, 332 and 334 may become an interface with respective different data source(s). The system 302 may allow for mapping of communication across different parts of the network environment 300, specifically different data sources. Each of the nodes 330, 332 and 334 may be configured slightly different such that each node may be deployed with its respective location (e.g., based on legal, security policies, etc. relating to the respective location). Each EQB node 330, 332 and 334 may provide multiple functionalities, including, but not limited to, semantic discover and translation based on rules, in-memory calculation, data source matching, query distribution, query plan construction, and query result integration/caching, etc.

Figure 4:
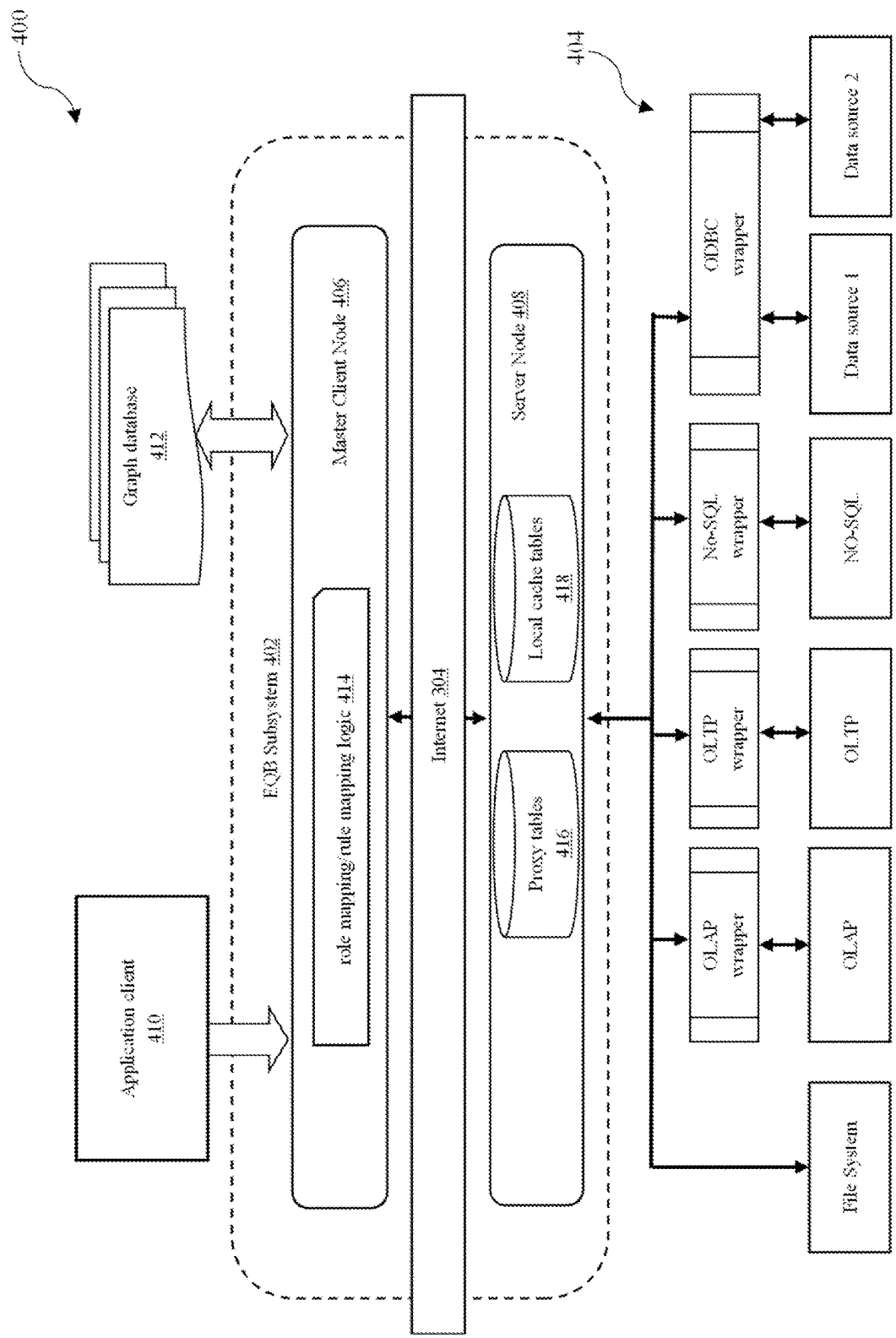
FIG. 4 is an example diagrammatic view of a query base system including a query base subsystem in communication with multiple data sources therein according to one or more example implementations of the disclosure.

Example FIG. 4 is a schematic diagram of an example query base system 400 (e.g., enterprise query base system). As shown, the query base system 400 may include a query base subsystem 402 (e.g., enterprise query base subsystem such as an enterprise query base platform) that may interact with external applications and data sources. As shown, the query base subsystem 402 may be in communication with multiple data sources (e.g., data sources 404). As shown, the EQB subsystem 402 may include (at least) two nodes: one node may provide client functionality (referred to as a master client node 406), and another node may provide server functionality (referred to as a server node 408). The two nodes 406 and 408 may interact by means of a network infrastructure, such as via the Internet 304. The data sources 404 may be separated from the master client node 406 via a firewall, and the server node 408 may be located behind the firewall to be able to access and communicate with the data sources 404. In examples where there are at least two nodes (e.g., master client node 406 and server node 408), the master client node 406 may not have a direct connection to the data sources 404 behind the firewall where the server node instead (e.g., server node 408) may be used to interact with the data sources 404 directly. This is important to have separation (e.g., master client node connected to data sources via at least one server node) for security purposes as the data sources (e.g., databases) behind the firewall may not be able to communicate with user directly outside the firewall. This is also important for performance reasons to prevent these data sources from negatively impacting performance (e.g., slow down effect) of the user device and/or the master client node as the server node may be deployed separately with the data source of the organization/enterprise (e.g., user accesses data via master client node which indirectly accesses the data via the at least one server node). Fetching large data from remote data sources over the Internet and processing such data at the master client node may impact performance. Instead, the master client node (and therefore the user device) may interact with data of a query result (as obtained by the server node). In summary, this master/client server node example may be elastic enabling deployment that may address security and/or performance concerns. In other examples, such as single EQB node example described below, data sources may be directly accessible by the single master EQB node (e.g., one EQB node deployed). In the single node examples, there may be a direct connection to the data sources 404 behind the firewall.

The query base system 400 may also include an application client 410 to receive a query instance such as from a user (also, sometimes referred to as a user query). The query base system 400 may further include a graph database 412 that may contain metadata (e.g., ontology metadata for semantic functionality) for processing the user query. The graph database 412 may be used for semantic layer to interpret the query instance (e.g., natural language query instance). The master client node 406 may be configured to interact with the application client 410 as well as with the graph database 412. For example, the application client 410 may receive the query instance and may pass the query instance to the client node 406 in the EQB subsystem 402. The master client node 406 may implement a role mapping/rule mapping logic 414 for processing the received query instance, for example, for not only structured query language (no-SQL) or structured query language (SQL) translation. SQL may be used with databases (e.g., relational databases (RDBMS)) such as PostgreSQL, MySQL, Oracle, Microsoft SQL, and the like whereas no-SQL may be used with databases (e.g., non-relational or distributed databases) such as Redis, RavenDB, Cassandra, MongoDB, BigTable, HBase, Neo4j, CouchDB, and the like. In particular, the master client node 406 may process the query instance to generate one or more relational query instances based at least in part on the query instance, with each of the one or more relational query instances to be processed by the server node 408. The query instance received may be in the form of a natural language query (NLQ). The query instance may be processed to generate the relational query instances that may be in the form of SQL queries. The master client node 406 may process (and translate) the query instance (e.g., user query as NLQ) to generate relational query instances that may be used for accessing and querying e.g. relational databases. For example, the NLQ query instance may be "show me the sales for my company" and the corresponding SQL relational query instances may be generated as "select sum(invoice.amount) from sales_table" (e.g., NLQ query instance may be translated to the generated SQL relational query instance). The SQL relational query instance may be in different forms such as "select" SQL text format, internal abstract tree structure, and the like. In some examples, the master client node 406 may receive a natural language query request related to obtaining data stored in the multiple data sources 404. In such case, the master client node 406 may parse the natural language query request to generate the query instance. In some implementations, the master client node 406 may utilize metadata information, from the graph database 412, for parsing of the natural language query (e.g., metadata information may be used to understand and translate natural language query). The graph metadata, as received from the graph database 412, may help the master client node 406 to translate the query using a Natural Language Processing (NLP) service to further disambiguate the query (e.g., NLP may be used for determining intents and disambiguate natural language query). As described above, the graph metadata may be ontology metadata that may be in the form of ontology graphs for semantic reasoning (e.g., ontology metadata may include saved ontology graphs used for semantic reasoning). The master client node 406 may use this ontology metadata to parse (e.g., identify vocabulary, meaning, intent, dimension—such as what does "sales" mean based on ontology metadata), understand the NLQ query instance (e.g., may resolve ambiguities in the NLQ query instance), and then mapping in order to generate accurate corresponding relational query instances (e.g., SQL relational query instances). For example, the query instance may be initially received from the user in natural language (e.g., as a voice or text). Then, the system may consult the graph metadata (e.g., of the graph database 412) to provide NLP and may use mapping to translate the query instance to the relational query instance (e.g., "select" statement). The query instance may be translated to the relational query instance based on the graph metadata (e.g., based on mapping).

Further, the server node 408 may be configured to optimize the one or more relational query instances to distribute among one or more of the data sources 404 in communication therewith (e.g., optimize may mean use of statistics, histogram, and/or rules to find an optimal plan for distribution and execution of the relational query instances). The server node 408 may include proxy tables 416 and local cache tables 418. The proxy tables 416 (e.g., proxy tables/views) and the local cache tables 418 may include information to build a query plan for distribution of the relational query instances among one or more of the data sources 404. In the examples, the proxy tables 416 may include a partial or a complete map of the data structure in the one or more of the multiple data sources 404. The partial or complete map is pre-configured based on the data sources 404. For example, the partial or complete map is setup at a configuration stage or registration stage (e.g., register data sources 404 or specifically register tables of the data sources 404 which may be used to create pre-configured partial or complete map of all data sources 404). The partial or complete map may be updated each time new data is added to data sources 404 or new data sources are added to collective group of data sources. The partial or complete map is important as the data is not stored in the server nodes. The partial or complete map may be a schema or location mapping to the data structure (e.g., mapping to a table or tables). The partial or complete map (also may be referred to as mapping) assists the server node 408 with generating subqueries that may be sent to data sources 404 or another server node. The results from different data sources 404 may be aggregated at later stages e.g. by the master client node 406.

The local cache tables 418 may be a data repository which temporarily stores data extracted from the data sources 404 based on the user query for further use such as for another similar query or the like. For example, the local cache tables 418 may be cache tables designed for improving performance. A frequently used data table may be stored as cache tables for improving performance of queries. Generally, it may be understood that the user query may require information from multiple data sources to be processed. The server node 408 may process the relational query instances (corresponding to the user query) to determine from which of the data sources may there be information needed to be gathered for processing of the user query instance. For example, the server node 408 may use the partial or complete map to determine that the locations of the information (needed for processing the query instance) may be in relational tables t1 and t2. The information may be specifically in column c1 of table t1 and column c1 of table t2. Using the partial or complete map, the server node 408 may determine where table t1 and table t2 reside so that it may generate and send sub-queries to each data source for the relevant data and then join the relevant data (e.g., different sub-query per data source and then join data of same data type). In summary, this example describes a join between two tables (e.g., t1 and t2) from two different data sources (e.g., data source 1 and data source 2, respectively) because the relevant data of these tables (based on query instance) may be joined to create full result (e.g., where part of needed result is in table t1 and part of needed result is in table t2). For example, a sub-query related to table t1 may be sent to data source 1 and another sub-query related table t2 may be sent to data source 2. The syntax for this SQL relational query instance may be "select t1.c1, t2, c1 from t1, t2 where t1.c2=t2.c2", "t1.c2=t2.c2" which means that both tables t1 and t2 have the same data type. This process of joining e.g. two tables may occur where the tables are the same data type.

It is to be understood that the master client node 406 may communicate with the server node 408 using query language (e.g., translated query language). On the other hand, the server node 408 may be positioned behind the firewall and may receive the processed query from the master client node 406. The server node 408 may then distribute and interact with the data sources 404. The server node 408 may directly interact with the data sources 404 which may include, for example, but is not limited to, a file system, and further with an Online Analytical Processing (OLAP) wrapper (which interacts with an OLAP), Online Transaction Processing (OLTP) wrapper (which interacts with an OLTP), No-SQL wrapper (which interacts with a NO-SQL), and a Generic Open Database Connectivity (ODBC) connector/wrapper (which interacts with data source 1, data source 2, etc.). Further, the functionalities of the EQB subsystem 402, including the master client node 406 and the server node 408, may be explained in reference to FIG. 5A below.

Figure 5A:
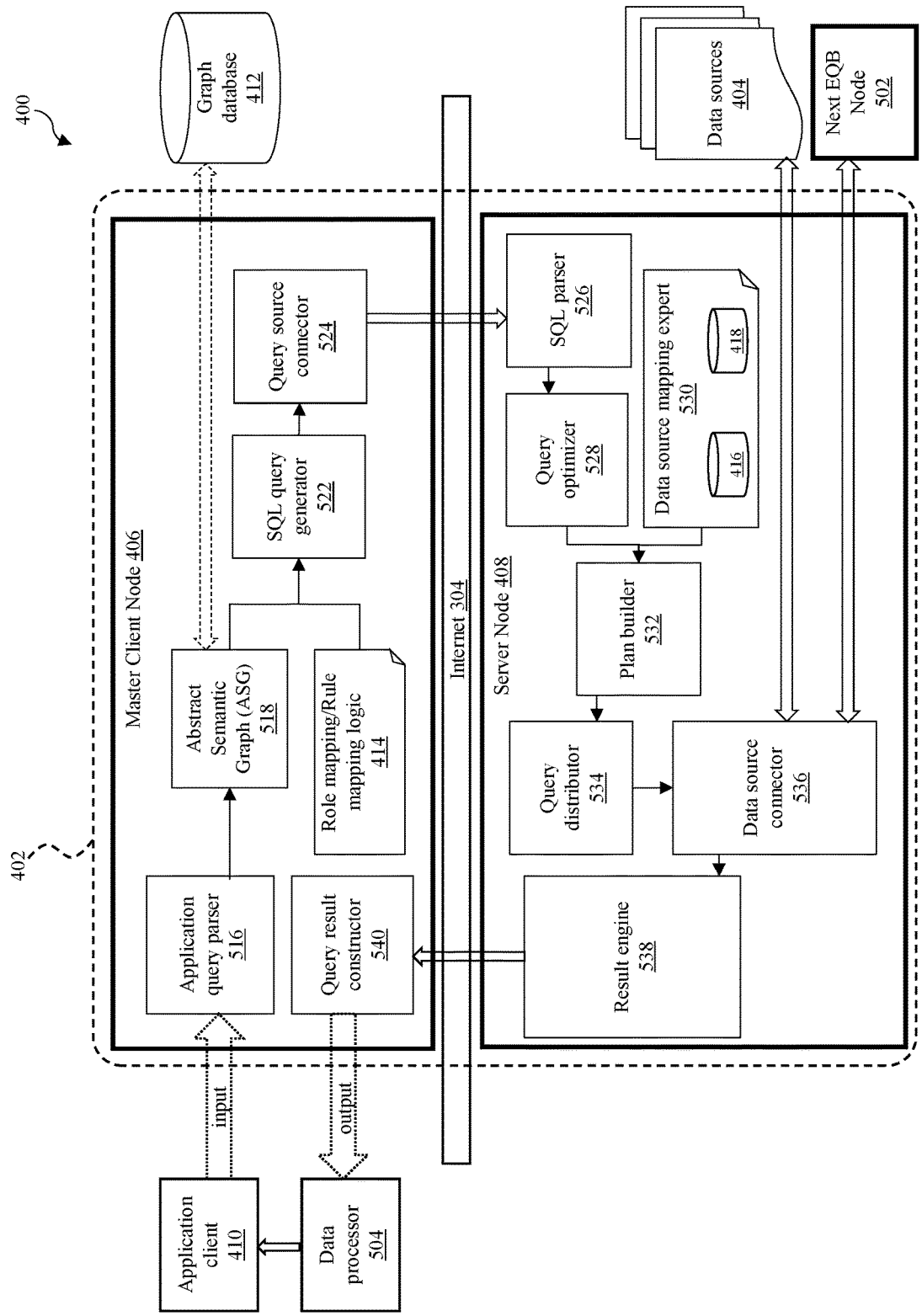
FIG. 5A is an example detailed diagrammatic view of a query base subsystem having a master client node and a server node according to one or more example implementations of the disclosure.

Example FIG. 5A is a schematic diagram of the EQB nodes 406, 408 of the query base subsystem 402 showing its various sub-components of the query base system 400. FIG. 5A also depicts internal data flow for the EQB subsystem 402. The EQB subsystem 402 is shown to be in external communication with the application client 410, a data processor 504, the graph database 412, data sources 404 and a next EQB node 502. For simplification, the data sources 404 may be considered as regular SQL data sources. As shown, the EQB subsystem 402 may include the master client node 406 and the server node 408. It is to be understood that the EQB subsystem 402 may function either as a standalone client node or a standalone server node if needed, depending on the required role for processing the received query. It may be appreciated that at least one of the multiple data sources is one of a database, a server node, and another EQB node.

As discussed, the network implementing the EQB node (such as, the EQB node 406, 408) may be a directional graph or tree-like mesh that passes the query from the master client node 406 to the data sources 404 through the server node 408. A root of this network tree may generate the query that is translated and distributed to the leaf nodes (e.g., location of data source) where there is a clear direction and client/server relationship (clear direction from client node which receives natural language, translates natural language, and then distributes relational query instance (or subquery) to different server nodes). In some cases, multiple server nodes 408 may need to be traversed to reach back end data source having the relevant data/information for processing the query.

In embodiments of the present disclosure, the EQB subsystem 402 at the root of the network, e.g., the EQB subsystem which is connected to the application client 410 may include the master client node 406 (and/or act as a client node) to process the query received from the application client 410. The same EQB subsystem 402 may also include the server node 408 (and/or act as a server node) which is in communication with one or more data sources (such as the data sources 404) to extract data for processing of the query received at the master client node 406. In some examples, such EQB subsystem 402 may act as a parent node or set of nodes for the network, which in turn may be connected to one or more other EQB nodes (such as, the next EQB node 502) which may act as sub-nodes for the query base system 400. The one or more enterprise query nodes (such as, the EQB nodes 406, 408 of the EQB subsystem 402) may be arranged in a hierarchical structure (or otherwise). In some embodiments, the one or more enterprise query nodes (such as, the EQB nodes 406, 408, 502) may be arranged as multiple enterprise query nodes across at least two or more different enterprise networks. These sub-nodes may include functionalities of the server node 408 (and/or act as the server node) and may be disposed in communication with respective one or more data sources to extract relevant data therefrom for processing the query. For example, when the server node 408 communicates with the next EQB node 502, the server node 408 changes its role from working as a "server node" to working as a "client node" and the next EQB node 502 works as a "server node" such that the server node 408 acts as client to the next EQB node 502. In examples, the next EQB node 502 may have same components as server node 408. In some examples, the next EQB node 502 may then communicate and work as the "client" with respect to other server nodes until the data is obtained from appropriate data source based on the query. In examples, the server node 408 may communicate with the next EQB node 502 and the next EQB node 502 may communicate with other EQB nodes via the Internet 304 directing the relational query instances towards relevant data sources 404 (via the next EQB node 502 and possibly other EQB nodes). The server node 408 determines where to direct the relational query instances based on the data source mapping (e.g., using partial or complete map for determining most efficient pathway to data sources 404). As described above, the EQB subsystem 402 preconfigured with a pre-determined partial or complete map. The mapping may be done when the EQB subsystem 402 is deployed and may be part of configuration for the EQB subsystem 402 such that all information in the data sources 404 may be mapped prior to use of the EQB subsystem 402. The mapping may be updated/configured at different stages in the future depending on changes to the data sources 404.

As shown in FIG. 5A, the EQB subsystem 402, or specifically the master client node 406 therein, may receive a query as input from the application client 410. It may be appreciated that the application client 410 (also generally referred to as a client electronic device) may be a user device, such as a personal computer, a smartphone, a tablet computer, or the like which may, optionally, provide a graphical user interface (GUI) to allow a user to input the query therein. Generally, the received query may be a natural language query. In the EQB subsystem 402, the query (e.g., user query), in the form of input (e.g., external signal), may be received by an application query parser 516 in the master client node 406. In some embodiments, the master client node 406 may be configured to receive the natural language query request related to obtaining data stored in the multiple data sources 404, and parse the natural language query request to generate the query instance. In the example, the generated query instance may have the required syntax to be further converted into an SQL query (as discussed below) for processing thereof.

In particular, as shown in FIG. 5A, the application query parser 516 may convert the user query to an Abstract Semantic Graph (ASG) 518. In particular, the master client node 406, or the application query parser 516 of the master client node 406, may be configured to generate at least one of an Abstract Semantic Graph (ASG) and an Abstract Semantic Tree (AST) for the received natural language query. An ASG, also known as term graph, may be a form of abstract syntax in which an expression of a formal or programming language is represented by a graph. ASG is typically at a higher level of abstraction than AST, which may be used to express the syntactic structure of an expression or program. ASG 518 may consult with the graph database 412 (e.g., graph database storage for client node), in communication therewith, to get the metadata needed for the user query. The generated ASG and/or AST may be implemented to receive the corresponding metadata information for the graph database 412 (e.g., metadata received may be used for semantic translation). Further, the master client node 406 may be configured to utilize metadata information, as received from the graph database 412, for parsing of the natural language query to generate the relational query instance (e.g., metadata may be used to understand and translate natural language query).

The metadata from the graph database 412 may be stored and combined with heuristic rules for role-based translation. Role-based translation may allow for users with different roles to access different information. For example, role-based translation may be used to understand and determine that "sales" for a CEO may mean the whole company sales while "sales" for a manager may mean for a specific designated group only or specific region (e.g., where manager works with sales in the US only). Role-based translation may include translation of the query instance to generate relational query instance(s) based on user's role (e.g., role of user requesting query). As described above, determining the role-based translation and generating the relational query instances may be based on the metadata and heuristic rules. For example, the relational query instance (e.g., SQL relational query instance) may have different restrictions based on security access (e.g., access to certain data may vary from a CEO to an engineering manager to a secretary for marketing group) and possibly different semantics (e.g., from one user to another user based on their role such as meaning of "sales" for sales manager of US division may vary from meaning of sales for a CFO). Further, NLP techniques may be integrated to make translation more robust and elastic. The system may utilize a set of graph database style token languages for interfacing of the NLP unit. Abstract Semantic Graph (ASG) and Abstract Semantic Tree (AST) may be used as the internal language for pass through and processing. In some examples, the master client node 406 may receive Abstract Semantic Graph (ASG) query from the application client 410 (e.g., in form of JSON format as user query), may translate the query instance into a relational query instance (e.g., translate ASG into an SQL query by consulting a graph database), and send the query to the server node 408 (or the query is sent to data source directly).

The master client node 406 may be further configured to process (e.g., parse, translate or compile, normalize, etc.) the query instance to generate one or more relational query instances based at least in part on the query instance. The parsing (e.g., may parse different languages such as XML, SQL, language, etc.), translating (e.g., may translate same different languages that were parsed), normalizing or compiling (e.g., normalize or compile to system to be processed as described), and the like may be standard processes but may use a semantic layer (e.g., semantic layer used during translation). Each of the one or more relational query instances may be processed by at least one server node 408. The master client node 406 may utilize role mapping/rule mapping logic 414. Role mapping/rule mapping logic 414 may be used to control the different queries generated based on different roles for context/permission. In the example, the query instance along with the acquired metadata (e.g., metadata received by ASG 518 from graph database 412) may then be passed to an SQL query generator 522 which may make use of the configured role mapping/rule mapping logic 414 (e.g., stored logic) to generate an SQL query (e.g., relational query instance). The generated SQL query may be sent to a query source connector 524. The query source connector 524 may include a map of the server nodes, and may send the generated SQL query to the relevant server node(s) (such as, the server node 408) which may process the SQL query to extract data from one or more data sources 404 or further pass down the query to the next EQB node 502, as required. That is, the one or more relational query instances may be distributed among one or more server nodes 408 to extract data from the at least one data source (such as, the data sources 404) in communication therewith corresponding to the respective relational query instance received thereby.

The server node 408 may include an SQL parser 526 that receives a signal, e.g., the SQL query, from the query source connector 524 of the master client node 406. The server node 408 may be configured to optimize the one or more relational query instances to distribute among one or more of the at least one data source in communication therewith and/or at least one of other server nodes. The SQL parser 526 may parse the SQL query into a query tree and may send it to a query optimizer 528. The query optimizer 528 may then consult a data source mapping expert 530 (e.g., stored expert) to build a query execution plan by a plan builder 532. The data source mapping expert 530 may include the proxy tables (such as, the proxy tables 416 of FIGS. 4 and 5A) and local cache tables (such as, the local cache tables 418 of FIGS. 4 and 5A). The plan builder 532 in conjunction with the data source mapping expert 530 may use information from the proxy tables 416 and the local cache tables 418 to understand the structure and layout of the data sources and data contained therein to frame sub-queries for each of the relevant data sources and/or for the next EQB nodes 502 (with other data sources in communication therewith) for extracting data therefrom. The plan output, as generated by the plan builder 532, may be passed to a query distributor 534. The query distributor 534 may use logic for distribution in the plan output and may distribute the query (or queries) to data source connectors 536. The data source connectors 536 may make use of stored data source information in the build plan output to send the query to respective data sources 404 and/or to the next EQB node 502. The data source connectors 536 may further receive the extracted data from each of the queried data sources 404 and the next EQB node 502. The server node 408 may further include a result engine 538 which may be configured for the integration/aggregation/execution of the extracted data from the data sources 404 and/or from the next EQB node 502. The result engine 538 (in the server node 408) may be disposed in communication with a query result constructor 540 (in the master client node 406). It will be appreciated that any of the elements (and/or their associated roles) in any of the figures may be combined and rearranged without departing from the scope of the disclosure.

In the master client node 406, the query result constructor 540 may receive extracted data from each of the queried one or more server nodes 408. The query result constructor 540 may aggregate the received extracted data. The data or results from each data source may not be enough such that the query instance and the relational query instance may relate to data from multiple data sources. The query result constructor 540 may be used to aggregate the received extracted data when it comes from multiple data sources (e.g., process sub-query results from different data sources to answer user's query instance). In some embodiments, the query result constructor 540 of the master client node 406 may be further configured to process the aggregated data to generate a response based on the query instance. The query result constructor 540 may accordingly send an external signal, as output. In some implementations, the output having the aggregated data, as extracted from the queried data sources 404 and the next EQB node 502, may generally be raw data. The output from the query result constructor 540 may be received by the data processor 504 which may process the received aggregated data in the output to be passed to the application client 410 for perusal of the user (e.g., the result data and a template of display format of the data may be sent to a front end or user interface of the application client 410). For example, the user query may be a request related to a pie-chart for organization of last financial year results. In the example, the extracted raw data may be in the form of values or numbers indicating the relevant financial year results. The data processor 504 may process the extracted numbers to generate the required pie-chart to be sent to the application client 410, where it may be displayed in the GUI thereof as desired by the user.

As shown, the data processor 504 may be positioned external to the EQB subsystem 402. In other examples, e.g., where data template is for data visualization, the data processor 504 may be positioned within the EQB subsystem 402 such that the EQB subsystem 402 is configured to process the raw data in a format to be received by the application client 410. For example, as described above, the data processor 504 may process the result of query (from query result constructor 540) to generate information or data for display in the GUI (e.g., generate graph, table, chart of results based on templates for display).

Figure 5B:
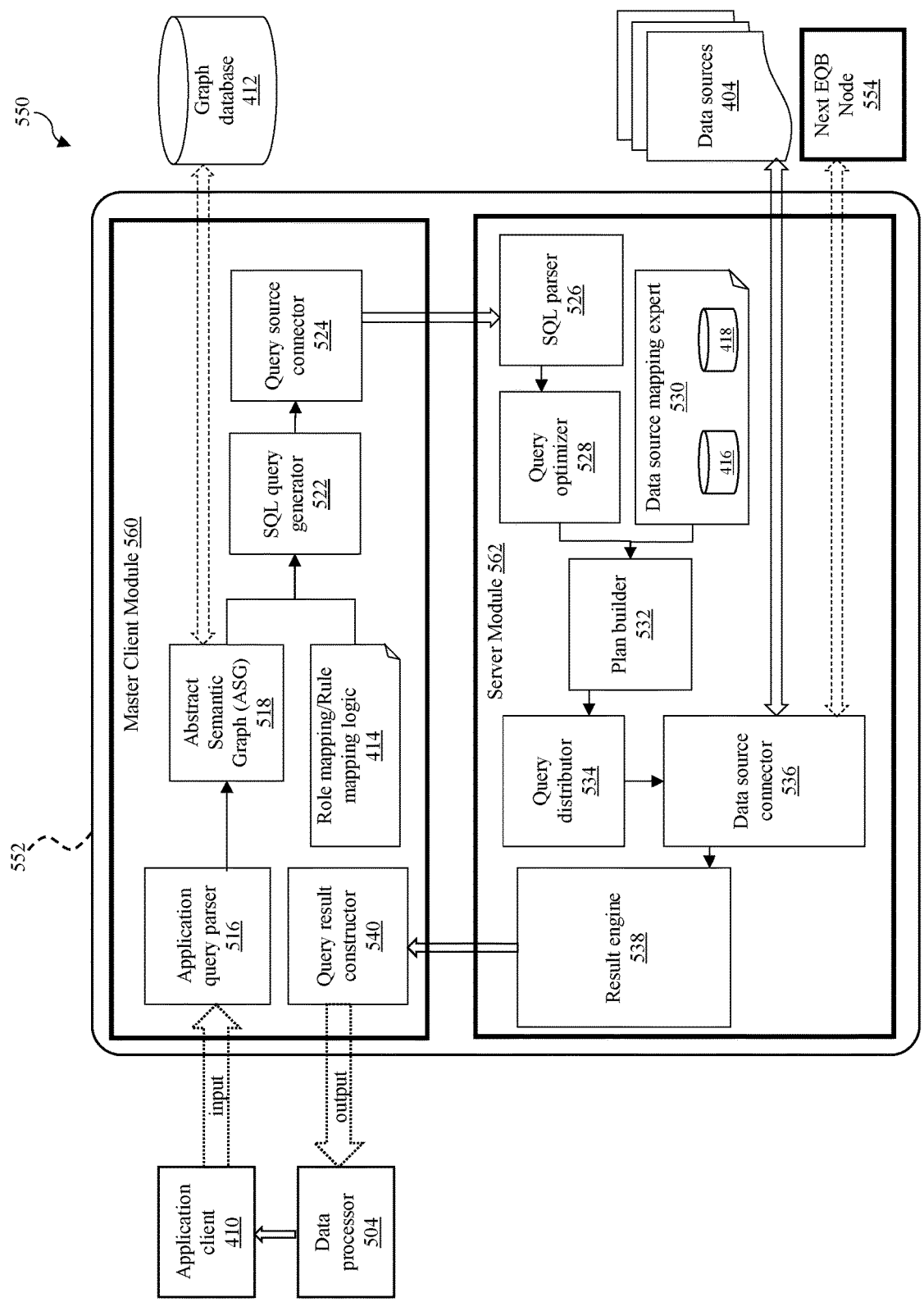
FIG. 5B is an example detailed diagrammatic view of an enterprise query base node having a master client module and a server module according to one or more example implementations of the disclosure.

Example FIG. 5B is a schematic diagram of a query base system 550 similar to the query base system 400 of FIGS. 4 and 5A. In this example, the query base system 550 may include a single EQB node 552 that may provide the functionalities of the EQB nodes 406, 408 together in one node instead of two separate nodes. In this example, as shown in FIG. 5B, the EQB node 552 may include EQB modules 560, 562 that may respectively provide the functionalities of the EQB nodes 406, 408. For example, a master client module 560 may provide similar functionality to the master client node 406 and a server module 562 may provide similar functionality to the server node 408. As shown, these EQB modules 560, 562 may have the same (or similar) sub-components to the EQB nodes 406, 408, respectively. Accordingly, the above descriptions of these sub-components may be applicable to the functionalities of the master client module 560 and server module 562. FIG. 5B may depict internal data flow for the EQB node 552 similar to the internal data flow of the EQB subsystem 402. In this example, the data flow occurs within the EQB node 552 such that information may be communicated directly between the modules 560, 562 without the need for the Internet 304. For example, EQB node 552 may have access one or more in-house data sources without needing to use the Internet 304. In other examples, information may be exchanged between the modules 560, 562 via the Internet. The EQB node 552 is shown to be in external communication with the application client 410, a data processor 504, the graph database 412, data sources 404 and possibly a next EQB node 554 (via the master client module 560 and server module 562). In some examples, the next EQB node 554 may not be included in the query base system 550. In other examples, the EQB node 552 may communicate with the next EQB node 502 (using server module 562) such that the EQB node 552 acts as client to the next EQB node 502. The EQB node 552 may communicate with the next EQB node 502 via the Internet 304 or without using the Internet 304. In examples, the next EQB node 502 may only include a server module that has same components as the server module 562. In some examples, the next EQB node 502 may then act or function as the "client" with other EQB nodes (these EQB nodes may also only include server modules having same components as server module 562) until the data is obtained from appropriate data source based on the query.

Figure 6:
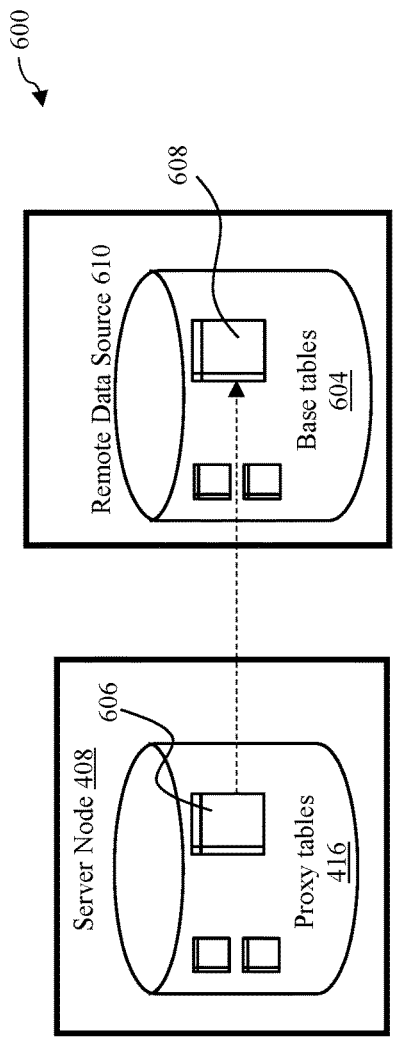
FIG. 6 is an example diagrammatic view of a proxy table being mapped to a base table associated with a remote data source according to one or more example implementations of the disclosure.

Referring now to the example FIG. 6, shown is a schematic diagram of an example process 600 in which one or more proxy tables 416 (as described above) are being mapped to one or more base tables 604 associated with a remote data source 610 (e.g., the remote data source 610 may include the base tables 604 and/or procedures). The remote data source 610 may be one of several data sources (e.g., part of the data sources 404). One of the proxy tables 416 (such as, proxy table 606) may refer to a remote data source mapped to one of the base tables 604 (such as, the base table 608) or procedure in an external data source. The utilization of the proxy table (such as, the proxy table 606) for building the plan for distribution of the query has been explained in the preceding paragraphs.

In some implementations, the data sources may need to be registered. The system may provide a user interface for configuring/registering new data sources. The configuring/registering of new data sources may be needed to access different data sources (e.g., knowledge of an internet protocol (IP) address of the data source and port number may be used by system to connect with each data source). In this regard, the system may need to have pre-defined data sources that are understood by the EQB nodes, or specifically the server nodes, therein. For external data sources, the registration may include a connection definition depending on the data source type. An example of creating a remote server for a data source may be using the following Data Definition Language (DDL) statement as follows:
REGISTER SERVER 'RemoteSS'
CLASS 'EQBODBC'
USING 'rimu:6666';
Wherein 'RemoteSS' is the name of the remote server, 'EQBODBC' is a keyword indicating that the remote server is EQB and the connection to it is JDBC (Java Database Connectivity) which is a Java API to connect and execute the query with the database, and rimu:6666 is the computer name and the TCP/IP port number where the remote server is located. It will be appreciated that languages other than Java may also be used without departing from the scope of the present disclosure.

The local proxy table (such as, the proxy table 606) that maps to the remote object may enable location transparency of remote data. The database administrator (DBA) may be able to create the proxy table 606 to access any object (including tables, views, and procedures) that the remote database exports as a candidate for a proxy table. In case of a non-relational data source, local proxy tables 416 (such as, the proxy table 606) may not correspond to a remote relational table. In this case, the mapping from the non-relational data source to the relational model may be done by an adapter. For example, in case of flat files, a list of .csv files with the same structure may map to a single proxy table. In another example, in case of web services, a set of XML complex elements may be mapped to a set of proxy tables 416. In some implementations, a specific GUI may be needed to custom the mapping at data source registration for each specific use case. The adapter may be a software layer that allows the enterprise query base (EQB) subsystem 402 to connect to a remote data source; for example, a generic ODBC connection to remote source, a native data source connection protocol, specific ODBC/JDBC/ODATA gateway for optimized server access, REST API based communication and/or a security layer, etc.

Figure 7:
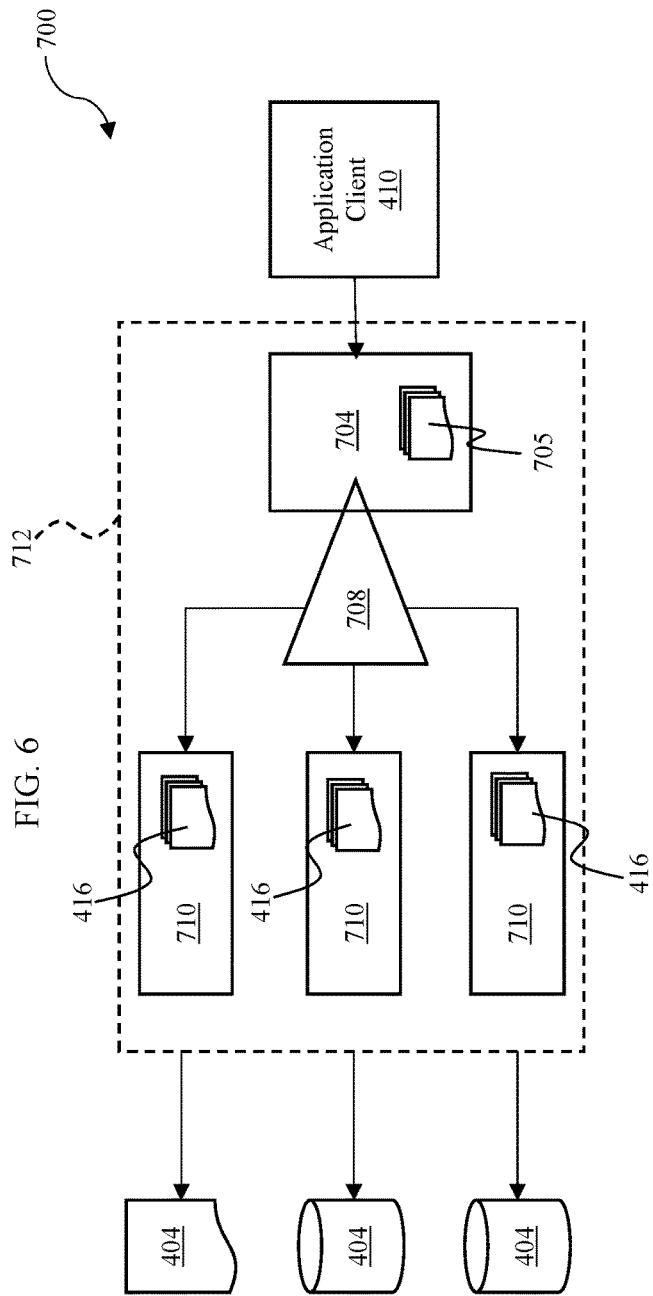
FIG. 7 is another example diagrammatic view of the enterprise query base node propagating a query therein according to one or more example implementations of the disclosure.

Example FIG. 7 is a simplified schematic diagram of a query base system 700 depicting propagation of a query therein. As shown, the application client 410 may send the query (e.g., natural language query) to an application query parser 704 (which is similar to application query parser 516 as discussed above and may provide similar functionality thereof). In some examples, the query may be constructed against a federated table 705. For example, the query may be created using the federated table (e.g., natural language query created against the federated table 705). During a consumption phase, the federated view may be used (e.g., the federated table 705) with the application query parser 704 for building the queries sent for execution to data sources 404 via a query engine 708. The data sources 404 may be transparent to the query engine 708. Each data source 404 may be any external database system or another EQB node which may act as a proxy for a set of data sources behind a firewall, etc. Communication between the query engine 708 and the data sources 404 may be encapsulated into a query engine operator. The query engine 708 may access the remote data sources 404 via the EQB nodes 710 with their corresponding encapsulated proxy tables 416 mapped to the data sources 404, similar to a local table access, by sending sub-queries thereto, which may be in connection with the data sources 404. The query engine 708 may represent functionality of multiple EQB nodes 710 (e.g., master client node 406 and server node 408 and optionally next EQB node 502) that may be used to enable the EQB nodes 710 to generate a query, distribute query, access data based on query, etc. (as described above and may provide functionality thereof). The EQB nodes 710 together with the query engine 708 and the application query parser 704 may form an EQB subsystem 712 (like the EQB subsystem 402). The data sources 404 may be definable as taking input parameters (e.g., the mapped data source object may be a function or procedure with the input parameters). This mapping to a procedure call may be useful to generate a result set dynamically. Further, in the examples, for satisfying the federation mapping workflows of the system, two kinds of additional objects may be added including, e.g.: domain tables to be used for specifying domain of values and lookup tables to be used for associating source column values to given domain of values. In some examples, low level class encapsulation may be used such that remote data source access may be encapsulated into a scan operator, e.g., "RemoteScan". The scan operator "RemoteScan" may be a leaf node of a query execution plan such that mapping may refer to a remote table object, a remote procedure or query result, or the like. Below is an example and non-limiting process shown in software pseudo-code for "RemoteScan":

```
Class RemoteScan
{
    RemoteScan (param1);    //This is a method to bind the proxy table
                            toa remote database object
                            // param1 will pass in the location and port of
                            the remote object.
    Open( );                //This is to open the connection to the
                            remote object. When
                            the connection is opened, the connection will
keep the connection until the data access is fully complete.
    Readrow(N);             // This is to read N rows from the remote
                            source.
                               It may depend on how the local batch size
                               is configured for processing. N
                               may be 1 if multiple rows are not kept for
                               processing at a time.
    Close( );               // Close will disconnect and close for the
                            current scan. The object can be
                            re-opened for the second connection and read.
    ……                      // Additional methods could include convert,
                            transform, join, and other
                            processing, etc.
}
```

In some implementations, for reducing data transfer, several optimization techniques may be used. For instance, query processing may push remotely as much work as possible to minimize data transfer and increase overall system scalability. This may include, but may not be limited to, full pass-through of single source statements, joins, ordering, sub-queries on sources (with and without tree transformation), filters (explicit expressions and implied from transitive closure and join clauses), aggregation (e.g., Eager-Lazy-Aggregation), semi-join reduction (e.g., bind join/partial semi join), etc. The main objectives of the query processing in the federation architecture may include, but is not limited to, translating the NLP processed semantic representation into a relational SQL representation, maximize performance by reducing data transfer and latency, distribute EQB query processing capabilities to remote data, optimize for the application performance, etc. It will be appreciated that any of the figures discussed throughout may be used in any combination without departing from the scope of the present disclosure.

The Query Base Process:

As discussed above and referring also at least to the example implementations of FIGS. 3-8, the query base process 10 may include each of one or more nodes (e.g., server nodes) communicating with at least one of the multiple data sources to access data therefrom. The query base process may further include receiving a query instance (e.g., a second node such as a client node may receive the query instance). The query instance may be processed to generate one or more relational query instances based at least in part on the query instance, with each of the one or more relational query instances to be processed by at least one node (e.g., server node). The one or more relational query instances may be distributed among the one or more server nodes to extract data from the at least one data source in communication therewith corresponding to the respective one or more relational query instances. The extracted data may be received from each of the one or more server nodes queried. The extracted data may be aggregated.

Figure 8:
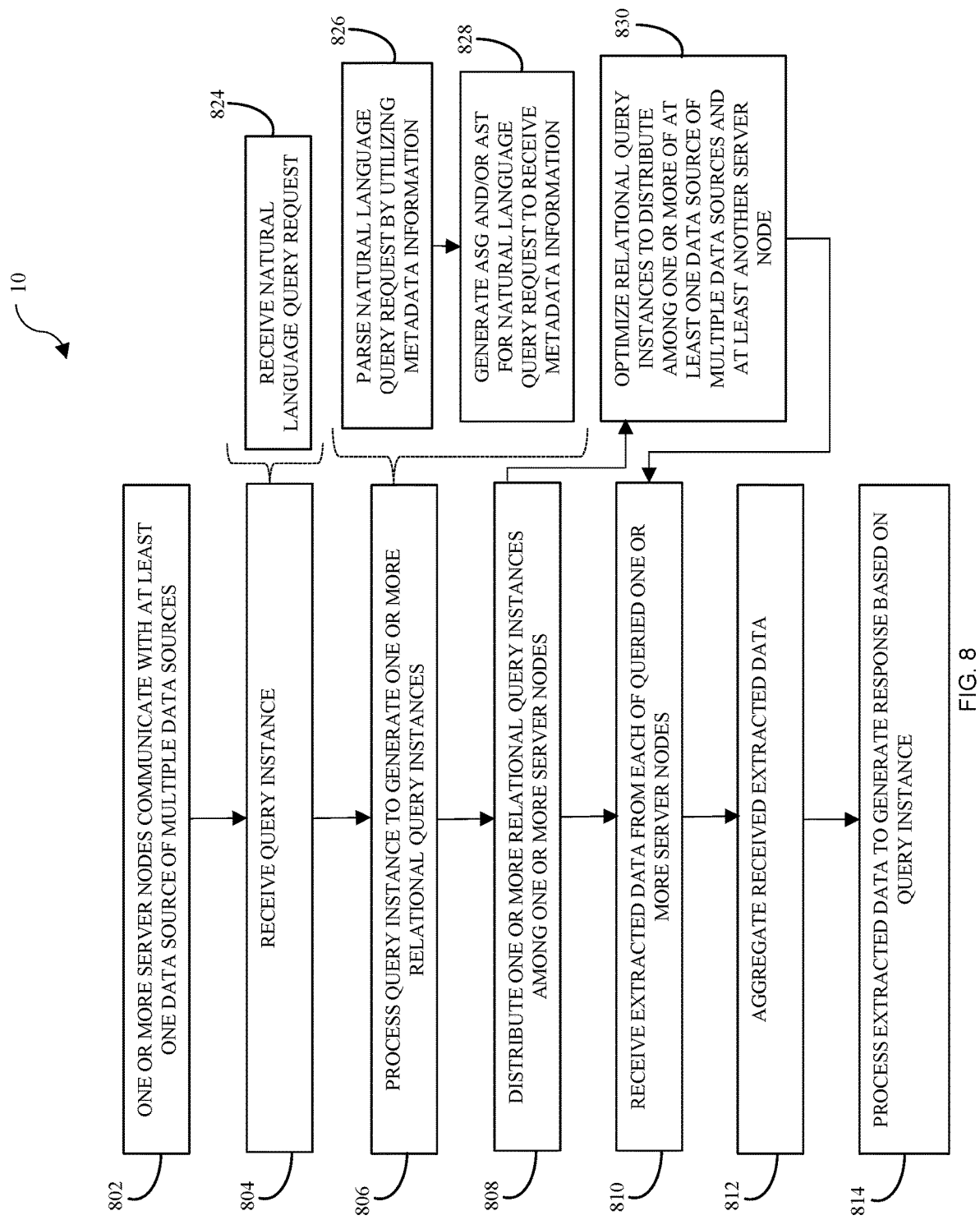
FIG. 8 is an example flowchart of the query base process for querying multiple data sources according to one or more example implementations of the disclosure.

The present disclosure further provides the query base process 10 that may be used for querying multiple data sources. Example FIG. 8 is an example flowchart of the query base process 10 for querying multiple data sources, according to example embodiments of the disclosure. The query base process 10 may communicate 802 (e.g., via one or more server nodes) with at least one data source of the multiple data sources to access data therefrom. The query base process 10 may receive 804 a query instance. In an example, receiving 804 the query instance may include receiving 824 a natural language query request related to obtaining data stored in the multiple data sources. The query base process 10 may process 806 the query instance to generate one or more relational query instances based at least in part on the query instance, with each of the one or more relational query instances to be processed by at least one server node of the one or more server nodes. In one or more examples, processing 806 the query instance may include parsing 826 the natural language query request to generate the one or more relational query instances by utilizing metadata information (e.g., metadata information may be used to understand and translate natural language query request) and the query base process 10 may generate 828 an Abstract Semantic Graph (ASG) and/or an Abstract Semantic Tree (AST) for the natural language query request to receive the metadata information (e.g., metadata information may be used for semantic translation). The query base process 10 may distribute 808 the one or more relational query instances among one or more server nodes to extract data from the at least one data source in communication therewith corresponding to the respective relational query instance received thereby. The query base process 10 may receive 810 extracted data from each of the queried one or more server nodes. In one or more examples, after the query base process 10 distributes 808 the one or more relational query instances, the query base process 10 may optimize 830 the relational query instances to distribute among one or more of the at least one data source of multiple data sources and another server node. The query base process 10 may receive 810 the extracted data after optimizing 830 the relational query instances. The query base process 10 may aggregate 812 the extracted data. The extracted data may be processed 814 to generate a response based on the query instance.

The query base system may be based on mesh concept, that works as a gateway for a data source federation, may distribute query, and may aggregate the result from different data sources. Although mesh concept may be generally known, this concept may not have been employed in a query-base type of system as it has different purposes and applications. Benefits to using mesh concept may relate to infrastructure level and application level. For example, the query base system may provide a query engine that may be used to query different types of databases (e.g., query base system may not store data with itself but may instead connect to "different" data sources where "different" may mean different locations of the data source and/or different types of data sources). In contrast from other data base systems, the query base system may have only network level of access plan of data but may not have a store level access plan. The query base system may cross different networks even including Internet to access data sources that may be behind a different firewall. The query base system may use a mesh network structure for allowing a new data source to plug into the query base system quickly and easily as well as flexible and elastic. The elastic mesh concept may address various complex enterprise data source issues which include hybrid data store including on premise and in cloud, and/or systems across geographic regions and different firewalls, etc. The mesh structure or layout may help to solve complicated enterprise scenarios where data may be scattered in different places such as cloud, on premise, or other locations. The system may cross different networks including internet and one or more access data sources behind a different firewall. This capability provides operational and cost benefits, but may also support the development and deployment of the next generation of analytical applications which may require the ability to access, synthesize, and integrate data from multiple systems in real-time regardless of where the data is located or what systems are generating it (e.g., different server nodes may integrate data residing outside the EQB subsystem or EQB platform). These applications' ability for cross-functional data in near-real time may drive new demand for data federation capabilities (e.g., accessing integrated data from multiple sources without creating redundant data stores).

The query base system may use different operators for querying data from different data sources (e.g., direct query base may access data sources transparently by query), which is in contradistinction to some known systems which may simply store data (e.g., some systems may allow for data to be copied or replicated from other data sources). In the system, each EQB node may have multiple data source connectors to connect to different data sources which are accessible by the particular EQB node. If a data source cannot be accessed by the current EQB node, another new EQB node may be deployed in the system/network accessible to the data source. The previous EQB node may talk to the new EQB node to access the data source (e.g., the new EQB node may represent one or more data sources behind a same firewall). Thus, the system may provide functionality of being able to query all individual data across different data sources (e.g., no need to copy or replicate data). That is, the process may include translating query, then query data sources (e.g., databases) directly via node to obtain result(s).

Further, the system may integrate with Natural Language Processing (NLP), which may handle semantic mapping and may remove the barrier for the application to query different data sources with different query languages. The query base system may use semantic operations that may be adapted for different types of data sources, for example depending on type of data source, its network/geographic location, available access type, etc. This means that the system may be able to generate a subquery for one data source that may be completely different from a subquery generated for a second different data source, thus enabling the system to function across different types of networks and also different types of data sources. In some examples, the EQB nodes may use specific protocol depending on data source (e.g., specific protocol may enable EQB node to communicate with a specific type of data source). In the system, the EQB node may be configured to translate and distribute a query into a relational SQL query and seamlessly access data residing in data sources outside thereof by distributing query to different data sources. The EQB node may offer a translation framework for native expressions. For example, the EQB node may offer a translation framework for mapping a federation function to data source specific expressions taking into consideration, e.g., native dialects and semantic native expression differences. Further, the EQB node may provide a way for pass-through of expressions or execution of a complete statement in a data source's native syntax in order to use database specific native functions/operators and for performance reasons.

The EQB node may be a query base which works as a gateway for a data source federation, may distribute the query, and may aggregate the result from different data sources. The EQB node may parse the query, from the application client, into ASG and may translate graph database semantics into relational query instance(s) based on role mapping/rule mapping logic. Each EQB subsystem may include the client node and the server node, where each node may run independently depending on the need. The client node of the EQB subsystem may send the relational query instance(s) to the server node (or single data source port). The client node may further format/construct result(s) catered for the application client.

The system may be one directional in the sense that the query may be pushed down to the data source(s), whereas some example database management systems may be bi-directional that may obtain a query result and may then send the query result back, and if there is still missing information, such example systems may have to send a new query. In contrast, the system may send out one query that may move down chain towards different EQB nodes that may be able to pass the query in direction or directions towards multiple sources that have information needed for responding to the query. The system may send multiple queries down the chain to obtain query results from one source or more than one source. In the system, the query may not actually include the calculated route information but instead, each EQB node may keep the destination data source mapping and may optimize the query plan itself. In the system, each EQB node may be a sub-query engine and may process the sub-query (e.g., filtering, joining, aggregating, etc.).

The query base system may be a unique query processing mechanism which may translate a natural language processing (NLP) query into data queries and may distribute the query to different data sources intelligently. The system may use a query processing node mesh architecture which makes accessing the data sources elastic and robust. The system may not actually duplicate the data from the data sources but instead may query the real time data directly via the query pipeline. The system may make use of a query communication mesh concept which may provide a way to access and process integrated data from multiple sources without creating redundant data stores. This may provide a way to distribute and push down the query to the data stored at its native location and avoid moving massive sensitive data across the network. Further, the system may encapsulate the communication of different data sources and may provide a unified interface for data access and interchange. The system may integrate learning optimization processing to the distributed query plan based on heuristic rules as well as query execution metrics, which may tune the query plan automatically. Thus, the system may provide a unified view of data across multiple servers to access data in each server, transparently, without copying.

In some examples, the query base system may interact with a data lake (e.g., pull and copy all data into a relatively large repository) with data source replication. For example, the query base system may connect data from different data sources to the same data lake (e.g., extract, translate, and load data from different data sources into one centralized data lake). For this example, the process may be similar to what is described above except interactions are with a single data lake (e.g., EQB nodes may interact with data in data lake). A benefit of this process may be that data can be easily accessed from the data lake.

In other examples, query cache and query/data encryption may be used. This may improve performance by running previously executed queries found in query cache. Query/data encryption may relate to security where encryption may be added to data protected data during transmission (e.g., prevent chance of data being obtained through attack during transmissions).

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computing system including one or more processors and one or more memories configured to perform operations for querying multiple data sources, comprising:
   a plurality of nodes, wherein each node is configured to communicate with multiple data sources to access data therefrom; and
   a second node in communication with the one or more nodes, wherein the second node is configured to:
   receive a query instance;
   process the query instance to generate a plurality of relational query instances based upon, at least in part, the query instance, with each relational query instance of the plurality of relational query instances to be processed by the plurality of nodes, wherein the plurality of relational query instances are distributed among the plurality of nodes to extract portions of data from the multiple data sources in communication therewith corresponding to the plurality of relational query instances;
   receive extracted data of the portions of data from the multiple data sources from each of the plurality of nodes queried; and
   aggregate the extracted data of the portions of data from the multiple data sources to respond to the query instance.

2. The computing system according to claim 1, wherein the plurality of nodes are arranged in a hierarchical structure, and wherein the plurality of relational query instances are distributed among the plurality of nodes directionally from upper nodes to lower nodes.

3. The computing system according to claim 1, wherein the second node and the plurality of nodes are arranged across at least two or more different enterprise networks.

4. The computing system according to claim 1, wherein the second node is configured to receive the query instance further comprises the second node is configured to receive a natural language query request related to obtaining data stored in the multiple data sources; and wherein the second node is configured to process the query instance further comprises the second node is configured to parse the natural language query request to generate the plurality of relational query instances.

5. The computing system according to claim 4, wherein the second node is configured to parse the natural language query request further comprises the second node is configured to utilize metadata information.

6. The computing system according to claim 5, wherein the second node is further configured to generate at least one of an Abstract Semantic Graph (ASG) and an Abstract Semantic Tree (AST) for the natural language query request, to receive the metadata information.

7. The computing system according to claim 1, wherein the second node is further configured to process the extracted data to generate a response based on the query instance.

8. The computing system according to claim 1, wherein the at least one node of the one or more nodes is further configured to optimize the plurality of relational query instances to distribute among the multiple data sources and at least another node of the plurality of nodes.

9. The computing system according to claim 1, wherein the multiple data sources is one of a database and a node of the plurality of nodes.

10. A computer-implemented method for querying multiple data sources, the computer-implemented method comprising:
   receiving a query instance;
   processing the query instance to generate a plurality of relational query instances based upon, at least in part, the query instance, with each relational query instance of the plurality of relational query instances to be processed by the plurality of server nodes;
   distributing the plurality of relational query instances among the plurality of server nodes to extract portions of data from the multiple data sources in communication therewith corresponding to the plurality of relational query instances;
   receiving extracted data of the portions of data from the multiple data sources from each of the plurality of server nodes queried; and
   aggregating the extracted data of the portions of data from the multiple data sources to respond to the query instance.

11. The computer-implemented method according to claim 10 wherein the distributing the plurality of relational query instances further comprises distributing the plurality of relational query instances among the plurality of server nodes directionally from upper server nodes to lower server nodes.

12. The computer-implemented method according to claim 10 wherein the distributing the plurality of relational query instances further comprises distributing the plurality of relational query instances among the plurality of server nodes across at least two or more different enterprise networks.

13. The computer-implemented method according to claim 10 wherein the receiving the query instance further comprises receiving a natural language query request related to obtaining data stored in the multiple data sources; and wherein the processing the query instance further comprises parsing the natural language query request to generate the plurality of relational query instances.

14. The computer-implemented method according to claim 13 wherein the parsing the natural language query request further comprises utilizing metadata information.

15. The computer-implemented method according to claim 14 further comprising generating at least one of an Abstract Semantic Graph (ASG) and an Abstract Semantic Tree (AST) for the natural language query request, to receive the metadata information.

16. The computer-implemented method according to claim 10 further comprising processing the extracted data to generate a response based on the query instance.

17. The computer-implemented method according to claim 10 further comprising optimizing the plurality of relational query instances to distribute among the multiple data sources and at least one of another server node of the plurality of server nodes.

18. The computer-implemented method according to claim 10, wherein the multiple data sources is one of a database and a server node of the plurality of server nodes.

19. A computer program product residing on a computer readable storage medium having a plurality of instructions stored thereon which, when executed across one or more processors, causes at least a portion of the one or more processors to perform operations comprising:

receiving a query instance;

processing the query instance to generate a plurality of relational query instances based upon, at least in part, the query instance, with each relational query instance of the plurality of relational query instances to be processed by the plurality of server nodes;

distributing the plurality of relational query instances among the plurality of server nodes to extract portions of data from the multiple data sources in communication therewith corresponding to the plurality of relational query instances;

receiving extracted data of the portions of data from the multiple data sources from each of the plurality of server nodes queried; and aggregating the extracted data of the portions of data from the multiple data sources to respond to the query instance.

20. A computer-implemented method for querying multiple data sources, the computer-implemented method comprising:

receiving a query instance;

processing the query instance to generate a plurality of relational query instances based upon, at least in part, the query instance, with each of the plurality of relational query instances to be processed by a server module;

sending the plurality of relational query instances to the server module to extract portions of data from multiple data sources in communication therewith corresponding to the plurality of relational query instances;

receiving extracted data of the portions of data from the multiple data sources from the server module queried; and aggregating the extracted data of the portions of data from the multiple data sources to respond to the query instance.

21. The method according to claim 20 further comprising one or more enterprise query nodes, wherein each enterprise query node comprises one of a client module and one of the server module.

22. A computer-implemented method for querying multiple data sources, the computer-implemented method comprising:

receiving a query instance;

processing the query instance to generate a plurality of relational query instances based at least in part on the query instance, with each of the plurality of relational query instances to be processed by at least one server node;

distributing the plurality of relational query instances among a plurality of server nodes to extract portions of data from multiple data sources in communication therewith corresponding to the respective plurality of relational query instances received thereby; and receiving extracted data of the portions of data from the multiple data sources from each of the queried plurality of server nodes.

\* \* \* \* \*